United States Patent
Kim et al.

(10) Patent No.: US 9,422,401 B2
(45) Date of Patent: *Aug. 23, 2016

(54) RECYCLABLE POLYARYLENE SULFIDE AND PREPARATION METHOD THEREOF

(71) Applicant: SK Chemicals Co., Ltd., Gyeonggi-Do (KR)

(72) Inventors: Sung-Gi Kim, Gyeonggi-do (KR); Il-Hoon Cha, Seoul (KR)

(73) Assignee: SK Chemicals Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/612,939

(22) Filed: Feb. 3, 2015

(65) Prior Publication Data

US 2015/0152227 A1   Jun. 4, 2015

Related U.S. Application Data

(62) Division of application No. 13/582,874, filed as application No. PCT/KR2011/001391 on Feb. 28, 2011.

(30) Foreign Application Priority Data

Mar. 9, 2010   (KR) .................. 10-2010-0021005

(51) Int. Cl.
  C08G 75/14   (2006.01)
  C08G 75/16   (2006.01)
  C08G 75/02   (2016.01)
  C08J 5/18    (2006.01)

(52) U.S. Cl.
  CPC ............... *C08G 75/16* (2013.01); *C08G 75/02* (2013.01); *C08G 75/14* (2013.01); *C08J 5/18* (2013.01); *C08J 2381/04* (2013.01)

(58) Field of Classification Search
  CPC ............. C08G 75/14; C08G 75/0263; C08G 75/0268; C08G 75/025
  USPC ................. 528/381, 389, 373, 388
  See application file for complete search history.

(56) References Cited

U.S. PATENT DOCUMENTS

| | | |
|---|---|---|
| 2,513,188 A | 6/1950 | Macallum |
| 2,583,941 A | 1/1952 | Gordon, Jr. |
| 4,663,431 A | 5/1987 | Fujii et al. |
| 4,771,120 A | 9/1988 | Alewelt et al. |
| 4,786,713 A | 11/1988 | Rule et al. |
| 4,792,600 A | 12/1988 | Rule et al. |
| 4,855,393 A | 8/1989 | Rule et al. |
| 4,921,935 A | 5/1990 | Dorf et al. |
| 4,952,671 A | 8/1990 | Fagerburg et al. |
| 5,037,952 A | 8/1991 | Schmidt et al. |
| 8,242,233 B2 | 8/2012 | Lee et al. |
| 8,759,478 B2 | 6/2014 | Shin et al. |
| 9,249,263 B2 | 2/2016 | Kim et al. |
| 2009/0203872 A1 | 8/2009 | Lee et al. |
| 2010/0022743 A1 | 1/2010 | Lee et al. |
| 2012/0322971 A1 | 12/2012 | Kim et al. |

FOREIGN PATENT DOCUMENTS

| | | |
|---|---|---|
| CN | 101595165 A | 12/2009 |
| JP | 3506047 A | 12/1991 |
| JP | 05025275 A | 2/1993 |
| JP | 05-178994 A | 7/1993 |
| JP | 05320343 A | 12/1993 |
| JP | 06-248078 A | 9/1994 |
| JP | 10158399 A | 6/1998 |
| JP | 2010501661 A | 1/2010 |
| JP | 2012513492 A | 6/2012 |
| JP | 2010515782 A | 5/2013 |
| KR | 10-2008-0018770 | 2/2008 |
| KR | 10-2008-0064737 A | 7/2008 |
| TW | 200844143 A | 11/2008 |
| WO | WO-2008082267 A1 | 7/2008 |

OTHER PUBLICATIONS

"Polyphenylene Sulfide", DIC.PPS. Guide Date 9th Edition, (Jul. 1, 2005), 18 pgs.

Tauchida, Eishua, et al., "Synthesis of High Molecular Weight Poly(phenylene sulfide) by Oxidative Polymerization via Poly(sulfonium cation) from Methyl Phenyl Sulfoxide", Macromolecules vol. 26, (1993), 7144-7148.

"U.S. Appl. No. 13/582,874, Final Office Action mailed Jan. 23, 2015", 8 pgs.

"U.S. Appl. No. 13/582,874, Non Final Office Action mailed Aug. 7, 2014", 13 pgs.

"U.S. Appl. No. 13/582,874, Preliminary Amendment filed Sep. 5, 2012", 6 pgs.

"U.S. Appl. No. 13/582,874, Response filed May 27, 2014 to Restriction Requirement mailed Mar. 26, 2014", 7 pgs.

"U.S. Appl. No. 13/582,874, Response filed Nov. 7, 2014 to Non Final Office Action mailed Aug. 7, 2014", 8 pgs.

"U.S. Appl. No. 13/582,874, Restriction Requirement mailed Mar. 26, 2014", 8 pgs.

"Chinese Application Serial No. 201180013093.6, Office Action mailed Jul. 22, 2013", 6 pgs.

"International Application Serial No. PCT/KR2011/001391, International Search Report mailed Nov. 28, 2011", (w/ English Translation), 5 pgs.

Flory, "", Principles of Polymer Chemistry, 309, (1953), 2 pgs.

"U.S. Appl. No. 13/582,874, Examiner Interview Summary mailed May 27, 2015", 2pgs.

"U.S. Appl. No. 13/582,874, Notice of Allowance mailed Sep. 18, 2015", 10 pgs.

"U.S. Appl. No. 13/582,874, Response filed Jul. 23, 2015 to Final Office Action mailed Jan. 23, 2015", 10 pgs.

"European Application Serial No. 11753545.0, European Search Report mailed Jun. 22, 2015", 8 pgs.

"International Application Serial No. PCT/KR2011/001391, Written Opinion mailed Nov. 28, 2011", (w/ English Translation), 11 pgs.

"U.S. Appl. No. 13/582,874, Corrected Notice of Alowance mailed Dec. 10, 2015", 2 pgs.

*Primary Examiner* — Shane Fang

(74) *Attorney, Agent, or Firm* — Schwegman Lundberg & Woessner, P.A.

(57) ABSTRACT

The various embodiments of the invention relate to recyclable polyarylene sulfide that may exhibit and maintain excellent mechanical properties, particularly does not exhibit decrease in melt viscosity when it is molten, and thus exhibit little deterioration of mechanical properties, and a method for preparing the dame. The polyarylene sulfide has initial melt viscosity measured at 300° C. of 300 to 6000 poise, and melt viscosity after heat treated and molten at 300° C., equal to or greater than the initial melt viscosity.

6 Claims, No Drawings

RECYCLABLE POLYARYLENE SULFIDE AND PREPARATION METHOD THEREOF

CROSS REFERENCE TO RELATED APPLICATION

This application is a divisional of U.S. patent application Ser. No. 13/582,874, filed on 5 Sep. 2012, which application is a U.S. Nation Stage Filing under 35 U.S.C. 371 of International Application No. PCT/KR2011/001391 filed Feb. 28, 2011 and published as WO 2011/111940 A1 on Sep. 15, 2011, which application claims priority to and the benefit of Korean Patent Application No. 10-2010-0021005, filed Mar. 9, 2010, which applications and publication are incorporated herein by reference in their entirety.

FIELD OF THE INVENTION

The present invention relates to recyclable polyarylene sulfide that may exhibit and maintain excellent mechanical properties, does not exhibit decrease in melt viscosity when it is molten, and thus, exhibit little deterioration of mechanical properties, and a method for preparing the same.

BACKGROUND OF THE INVENTION

Currently, polyarylene sulfide is representative engineering plastic, and is in great demand for high temperature and corrosive environment and electronic products due to high heat resistance, chemical resistance, flame resistance, and electric insulation. The major uses include computer accessories, automobile accessories, coating of the part contacting corrosive chemical materials, and industrial chemical resistant fiber, and the like.

Presently, polyphenylene sulfide (PPS) is the only commercially available polyarylene sulfide. According to the current commercial production process of PPS, p-dichlorobenzene (pDCB) and sodium sulfide are used as raw materials and reacted in a polar organic solvent such as N-methylpyrrolidone, and the like. This method is known as a Macallum process, and the basic process is disclosed in U.S. Pat. Nos. 2,513,188 and 2,583,941, wherein some usable polar solvents are suggested, but N-methylpyrrolidone is currently most commonly used. This process uses dichloro aromatic compounds as raw material, and sodium chloride (NaCl) is generated as a by-product.

The polyphenylene sulfide obtained in the Macallum process includes residues such as sodium sulfide and organic solvent such as N-methylpyrrolidone, and the like to some degree. Due to the existence of the residues, decomposition may occur during use of the polyphenylene sulfide, and particularly, if it is melt-processed for recycling, decomposition of polyphenylene sulfide by resides may occur more significantly.

Accordingly, deterioration of mechanical properties according to use of polyphenylene sulfide after polymerization is often observed, and if it is molten and molded for recycling of the resin, mechanical properties may be further deteriorated, and thus, there is significant limitations in recycling of expensive polyphenylene sulfide.

SUMMARY OF THE INVENTION

The present invention provides polyarylene sulfide that may exhibit and maintain excellent mechanical properties, and particularly, exhibit little deterioration of mechanical properties when it is molten, and thus, is recyclable.

Further, the present invention provides a method for preparing the polyarylene sulfide.

The present invention also provides a molded product including the polyarylene sulfide.

The present invention provides polyarylene sulfide having initial melt viscosity measured at 300° C. of 300 to 6000 poise, and melt viscosity after treat treated at 300° C. and molten, equal to or greater than the initial melt viscosity.

The present invention also provides a method for preparing the polyarylene sulfide, including polymerization reaction of reactants including diiodide aromatic compounds, sulfur compounds, and based on 100 parts by weight of the diiodide aromatic compounds, 0.05 to 10 parts by weight of a polymerization terminator.

The present invention also provides a molded product including the polyarylene sulfide.

DETAILED DESCRIPTION OF THE INVENTION

Hereinafter, polyarylene sulfide according to one embodiment and preparation method thereof, and the like will be explained in detail.

During repeated studies on polyarylene sulfide that may exhibit and maintain excellent mechanical properties, and even after melt processed for recycling, has equal or more excellent properties compared to immediately after polymerization, the inventors completed the invention.

The inventors confirmed that polyarylene sulfide which has equal or greater melt viscosity compared to initial melt viscosity before heat treatment, even when it is heat treated at 300° C. and molten, may be prepared according to the following preparation method. Such melt viscosity change property is novel property distinguished from the melt viscosity change property of the polyarylene sulfide obtained by the existing Macallum process.

It was also confirmed that the polyarylene sulfide having the above melt viscosity change property has relatively high melt viscosity, specifically maximum melt viscosity of 6,000 poise, and thus, it may exhibit excellent mechanical properties. Particularly, as the results of experiments, it was confirmed that as the polyarylene sulfide may maintain or increase melt viscosity even after it is molten at 300° C., mechanical properties may not be deteriorated during the use of products including the polyarylene sulfide, and excellent mechanical properties before molding may be maintained even when it is melt processed and remolded for recycling.

Therefore, since the polyarylene sulfide may exhibit and maintain excellent mechanical properties, and exhibit little deterioration of mechanical properties even after remolten, it may be usefully applied in the industrial field of preparing and recycling polyarylene sulfide.

Meanwhile, the recyclable polyarylene sulfide according to one embodiment of the invention as explained above has initial melt viscosity measured at 300° C. of 300 to 6000 poise, and melt viscosity after heat treated and molten at 300° C., equal to or greater than the initial melt viscosity.

As explained above, the polyarylene sulfide has excellent thermal and mechanical properties basically exhibited during polymerization, and simultaneously, even after remolten for recycling, it has equal or more excellent mechanical property values compared to immediately before polymerization.

As used herein, 'initial melt viscosity' refers to melt viscosity 'immediately after polymerization' or melt viscosity after polymerization 'before it is molten to measure melt viscosity change rate at 300° C.'.

The polyarylene sulfide may preferably have melt viscosity change rate of 0 to 20%, as defined by the following Equation 1.

Melt viscosity change rate(%)=100(MV$_f$/MV$_i$−1)  [Equation 1]

In the Equation 1, MV$_i$ denotes the initial melt viscosity of polyarylene sulfide, and MV$_f$ is the melt viscosity of polyarylene sulfide after heat treating the polyarylene sulfide at 300° C. and melting it.

If polyarylene sulfide has melt viscosity change rate after heat treatment at a specific temperature in the above range, it may not exhibit decrease in melt viscosity even after it is remolten, and exhibit equal or more excellent mechanical properties compared to before it is molten, and thus, it may be used without deterioration of mechanical properties even after recycling.

The MV$_f$ may be defined as melt viscosity measured under shear rate of 1 rad/s in a plate-plate rheometer, 10 minutes after heat treating the polyarylene sulfide under inert gas atmosphere at 300° C. for 3 minutes to melt it. If inert gas is used to measure the melt viscosity change rate, nitrogen gas or argon gas, and the like may be used as the inert gas, and preferably, readily available nitrogen gas may be used.

And, the polyarylene sulfide may preferably have initial melt viscosity of 300 to 6,000 poise, more preferably 500 to 4,000 poise, most preferably 600 to 2500 poise.

And, the polyarylene sulfide may have number average molecular weight of 3,000 to 1,000,000, preferably 3,000 to 500,000, more preferably 3,000 to 50,000. And, the polyarylene sulfide may have relatively uniform dispersion degree of 2.0 to 4.0, preferably 2.2 to 3.8, as defined by the ratio of weight average molecular weight to number average molecular weight (Mw/Mn).

The polyarylene sulfide having the above number average molecular weight and/or dispersion degree may be manufactured into various products according to the molecular weight or melt viscosity.

Meanwhile, the polyarylene sulfide according to the above embodiments exhibits excellent thermal stability, and specifically, it has melting point (Tm) of 265 to 320° C., preferably 268 to 290° C., more preferably 270 to 285° C. By securing Tm in the high range, the polyarylene sulfide may exhibit excellent performances including high strength and improved heat resistance, and the like, when applied to engineering plastic.

And, the polyarylene sulfide according to the above embodiments exhibits excellent mechanical properties, and simultaneously, it does not substantially exhibit deterioration of mechanical properties even after it is remolten and/or reinjected.

Specifically, the polyarylene sulfide according to one embodiment may exhibit excellent mechanical properties, and particularly, the initial tensile strength of compounded resin including the polyarylene sulfide and 40 wt % glass is 1000 kgf/cm$^2$ or more, as measured according to ASTM D638.

Furthermore, the tensile strength of the compounded resin including the polyarylene sulfide that is 4 times extruded (namely, passing an extruder 4 times) and 40 wt % glass may be equal to or greater than the initial tensile strength, as measured according to ASTM D638. Thereby, even if the polyarylene sulfide according to one embodiment is recycled, mechanical properties may not be deteriorated. Thus, the polyarylene sulfide may be preferably used to mold engineering plastic requiring high strength, and the like.

And, the polyarylene sulfide may have iodine content less than 0.8 wt %. The iodine content may be quantified by measuring with ion chromatograph (IC).

Since the polyarylene sulfide includes residual iodines partly at the end group of the polymer even after polymerization, due to continued polymerization reaction of residual iodines in the polymerized polymer and unreacted sulfur, it may exhibit melt viscosity measured after it is remolten, equal to or higher than the initial melt viscosity.

According to another embodiment, there is provided a method for preparing the above explained polyarylene sulfide including polymerization reaction of reactants including diiodide aromatic compounds, sulfur compounds, and based on 100 parts by weight of the diiodide aromatic compounds, 0.05 to 10 parts by weight of a polymerization terminator.

The polymerization terminator and the sulfur compounds may be included in the initial reactants and the polymerization reaction may be progressed, however, a part of the sulfur compounds in the reactants may be introduced at a specific time elapsed after the polymerization reaction is initiated. By dividedly introducing a part of the sulfur compounds during the polymerization reaction, polyarylene sulfide according to one embodiment that does not exhibit deterioration of mechanical properties may be prepared. If a part of the sulfur compounds are dividedly introduced during the polymerization reaction, the content of the dividedly introduced sulfur compounds is not limited, but to optimize the properties of the finally prepared polyarylene sulfide, it may be 0.1 to 20 parts by weight, preferably 1 to 10 parts by weight, more preferably 1 to 7 parts by weight, based on 100 parts by weight of the sulfur compounds included in the initial reactants.

Furthermore, according to the above preparation method, polyarylene sulfide may be prepared without using an organic solvent or sodium sulfide. Thus, residues that may cause decomposition of resin do not substantially exist in the finally prepared polyarylene sulfide, and thus, there is little concern of deterioration of mechanical properties during use as a product. And, even if it is molt and molded for recycling, it may exhibit equal or more excellent mechanical properties compared to before recycling.

In the polyarylene sulfide obtained by the preparation method according to the above explained embodiment, iodines remains partly at the end of the main chain, and particularly, if an appropriate ratio of the polymerization terminator is added to the reactants and the polymerization reaction is progressed, an appropriate amount of residual iodines may be included partly at the end of the main chain of the polymerized polyarylene sulfide. Thus, since the speed of additional polymerization reaction between the residual iodines and unreacted sulfurs in the polyarylene sulfide is higher than the speed of polyarylene sulfide decomposition by unreacted residues in the polyarylene sulfide, polyarylene sulfide having the above explained melt viscosity change rate property may be prepared.

Meanwhile, the content range of the polymerization terminator is not limited as long as it is within the above range, but more preferably, 0.1 to 10 parts by weight of the polymerization terminator may be included based on 100 parts by weight of the diiodide aromatic compounds. As such, an appropriate amount of residual iodines may be included at the end of the main chain of the finally produced polyarylene resin by controlling the content of the polymerization terminator in the reactants, and thereby, polyarylene sulfide having melt viscosity after it is remolten, equal to or greater than the initial melt viscosity, may be obtained.

The polymerization terminator is not specifically limited as long as it may remove iodine groups included in the polymerized polymer to terminate polymerization, but it may be at least one preferably selected from the group consisting of diphenyl ether, diphenyl, benzophenone, diphenyl suldife, monoiodoaryl compounds, benzothiazole, benzothiazolesulfenamide, thiuram, dithiocarbamate and diphenylsulfide. More preferably, it may be at least one selected from the group consisting of iodobiphenyl, iodophenol, iodoaniline, iodobenzophenone, 2-mercaptobenzothiazole, 2,2'-dithiobisbenzothiazole, N-cyclohexylbenzothiazole-2-sulfenamide, 2-morpholinothiobenzothiazole, N,N-dicyclohexylbenzothiazole-2-sulfenamide, tetramethylthiuram monosulfide, tetramethylthiuram disulfide, zinc dimethyldithiocarbamate, zinc diethyldithiocarbamate, dibenzothiazyl disulfide, and diphenyl disulfide.

Still more preferably, it may be dibenzothiazole disulfide, diphenyl suldife, diphenyl ether, or biphenyl, wherein functional groups between phenyls function as an electron donor, thus exhibiting more higher reactivity of polymerization reaction.

Meanwhile, the diiodide aromatic compound that may be used in the polymerization reaction of the polyarylene sulfide may be at least one selected from the group consisting of diiodobenzene (DIB), diiodonaphthalene, diiodobiphenyl, diiodobisphenol, and diiodobenzophenone, but are not limited thereto, and diiodide aromatic compounds wherein an alkyl group or a sulfone group, and the like is additionally bonded as a substituent group, or heteroatom such as oxygen or nitrogen, and the like is contained in the aryl compound may be also used. The diiodide aromatic compounds may be in the form of various isomers according to the bonding position of iodine atoms, and compounds such as pDIB, 2,6-diiodonaphthalene, or p,p'-diiodobiphenyl, wherein iodines are symmetrically bonded at both ends at the farthest distance may be most preferable.

Furthermore, sulfur compounds that may be used are not limited. Commonly, sulfur exists as cyclooctasulfur (S8) at room temperature, but any commercially available solid state sulfur may also be used.

And, the diiodide aromatic compounds may be introduced in the content of 0.9 moles or more, based on the solid sulfur compounds. And, the sulfur compounds may be preferably included in the content of 15 to 30 wt %, based on the weight of the polyarylene sulfide prepared by reacting the diiodide aromatic compounds and the sulfur compounds. If the sulfur is added in the above range, polyarylene sulfide having increased heat resistance and chemical resistance, and simultaneously having excellent properties including mechanical properties, and the like may be synthesized.

Meanwhile, the polymerization reaction may be progressed under conditions that may initiate a polymerization of reactants including diiodide aromatic compounds, sulfur compounds and polymerization terminator. Preferably, the polymerization may be progressed under temperature-increasing and pressure-reducing conditions, and in this case, the polymerization reaction may be progressed for 1 to 30 hours while increasing temperature and reducing pressure under the initial reaction conditions of temperature of 180 to 250° C. and the pressure of 50 to 450 torr to the final temperature of 270 to 350° C. and the final pressure of 0.001 to 20 torr.

If the polymerization reaction is progressed under temperature increasing and pressure reducing conditions, polyarylene sulfide may exhibit excellent thermal stability, and it may exhibit melt viscosity change rate of 0% or more even after it is remolten for recycling, and thus, exhibit equal or more excellent mechanical properties compared to before recycling.

Meanwhile, the method for preparing polyarylene sulfide according to the above explained embodiment may further include a step of melt mixing reactants including diiodide aromatic compounds, sulfur compounds and polymerization terminator before the polymerization reaction step. The above explained polymerization reaction is progressed as a melt polymerization that is progressed in the absence of an organic solvent, and to progress the melt polymerization, reactants including diiodide aromatic compounds may be previously melt mixed, and then, the polymerization reaction may be progressed.

The melt mixing conditions are not limited as long as it may melt mix all the reactants, but preferably, the melt mixing may be progressed at a temperature of 130 to 200° C.

By conducting melt mixing before polymerization, melt polymerization may be more easily achieved.

Meanwhile, the polymerization reaction may be progressed in the presence of a nitrobenzene-based catalyst. And, if a melt mixing step is conducted before the polymerization reaction, the catalyst may be added in the melt mixing step. I was found out that if polymerization reaction is progressed in the presence of the nitrobenzene-based catalyst, polyarylene sulfide having higher melting point than the polymerization in the absence of a catalyst may be prepared. If polyarylene sulfide has low melting point, there is a problem in heat resistance of a product, and thus, to prepared polyarylene sulfide requiring heat resistance, the polymerization reaction may be progressed in the presence of a nitrobenzene-based catalyst. The nitrobenzene-based catalyst may include 1,3-diiodo-4-nitrobenzene, or 1-iodo-4-nitrobenzene, and the like, but is not limited thereto.

The polyarylene sulfide prepared according to the above preparation method has initial melt viscosity measured at 300° C. of 300 to 6000 poise, more preferably 500 to 4,000 poise, most preferably 600 to 2500 poise, and melt viscosity after it is heat treated and molten at 300° C., equal to or greater than the initial melt viscosity.

And, the polyarylene sulfide prepared according to the above preparation method has melt viscosity change rate of 0 to 20%, as defined by the following Equation 1:

Melt viscosity change rate (%)=100(MV$_f$/MV$_i$−1)  [Equation 1]

In the Equation 1, MV$_i$ denotes the initial melt viscosity of polyarylene sulfide, and MV$_f$ is the melt viscosity of polyarylene sulfide after heat treating the polyarylene sulfide at 300° C. to melt it.

The MV$_f$ may be defined as melt viscosity measured under shear rate of 1 rad/s in a plate-plate rheometer, 10 minutes after heat treating the polyarylene sulfide under inert gas atmosphere at 300° C. for 3 minutes to melt it.

And, the number average molecular weight, dispersion degree defined by weight average molecular weight to number average molecular weight, number average molecular weight, melting point, and the like of the polyarylene sulfide prepared according to the above preparation method are as explained in the embodiments of polyarylene sulfide.

According to yet another embodiment, there is provided a molded product including the polyarylene sulfide. The molded product may be in the form of a film, a sheet or fiber, and the like.

The molded product may be obtained by injection molding, extrusion molding, blow molding of the polyarylene sulfide. In the case of injection molding, mold temperature may be preferably 30° C. or more, more preferably 60° C. or more, still more preferably 80° C. or more in terms of crystallization, and it may be preferably 150° C. or less, more preferably 140° C. or less, still more preferably 130° C. or less in terms of modification of test piece. And, the product may be used as electric and electronic parts, construction element, automobile parts, machine parts or daily necessities, and the like. And the injection molded product may be compounded with glass fiber and then molded. The content of the glass fiber is not limited, but to maintain excellent properties of the polyarylene sulfide and simultaneously increase mechanical strength including tensile strength, and the like, it may be included in the content of 10 to 50 wt %, preferably 35 to 45 wt %.

The molded product may be made into various films or sheets including undrawn, uniaxially drawn, biaxially drawn film, sheet, and the like. If the molded product is fiber, it may be made into various fibers including undrawn, drawn, ultra-drawn fiber, and the like, which may be used as woven fabrics, knitting, non-woven fabrics (spunbond, melt blow, staple), rope, net, and the like.

The polyarylene sulfide of the present invention may exhibit and maintain excellent mechanical properties, particularly exhibit little deterioration of mechanical properties even when it is molten, and thus, it may be usefully applied in the industrial field of preparing and recycling polyarylene sulfide.

Hereinafter, the present invention will be explained referring to the following Examples and Comparative Examples, but the scope of the invention is not limited thereto.

Comparative Example

Polymerization of Polyarylene Sulfide

1. Polyarylene Sulfide of Comparative Example 1

0205P4 grade polyarylene sulfide (Ticona Company) was prepared. The polymer had melt viscosity (MV) of 700 poise, melting point TM of 282° C., and melt viscosity change rate of −12%/10 min, as measured under shear rate of 1 rad/s in a plate-plate rheometer, after heat treating the polyarylene sulfide under inert gas atmosphere at 300° C. for 3 minutes to melt it.

2. Polyarylene Sulfide of Comparative Example 2

Polyarylene sulfide of hb grade (Deyang Company) was prepared, which is polymerized grade polyarylene sulfide polymerized by the same method as Comparative Example 1 except that MV is different.

The polymer had MV 2000 poise, Tm 280° C., and melt viscosity change rate of −9%/10 min, as measured under shear rate of 1 rad/s in a plate-plate rheometer, after heat treating the polyarylene sulfide under inert gas atmosphere at 300° C. for 3 minutes to melt it.

3. Polyarylene Sulfide of Comparative Example 3

Polyarylene sulfide of Ryton P6 grade (Chevron Philips Company) was prepared, which is polymerized grade polyarylene sulfide polymerized by the same method as Comparative Example 1 except that MV is different.

The polymer had MV 1100 poise, Tm 281° C., and melt viscosity change rate of −23%/10 min, as measured under shear rate of 1 rad/s in a plate-plate rheometer, after heat treating the polyarylene sulfide under inert gas atmosphere at 300° C. for 3 minutes to melt it.

Example

Polymerization of Polyarylene Sulfide

1. Polymerization of Polyarylene Sulfide of Example 1

Reactants including 4000 g of para diiodobenzene, 10 g of polymerization terminator, 345 g of sulfur, and 15 g of 1,3-diiodo-4-nitrobenzene were melt mixed at 180° C. A polymerization reaction was progressed while increasing the temperature of the mixture from 180° C. to 340° C., and reducing the pressure from atmospheric pressure to 10 torr. 5 hours after the polymerization was initiated, 5 g of sulfur was additionally introduced, and polymerization was progressed for additional 3 hours to obtain polymer.

The produced polymer had MV 700 poise, Tm 280° C., and melt viscosity change rate of +3%/10 min, as measured under shear rate of 1 rad/s in a plate-plate rheometer, after heat treating the polyarylene sulfide under inert gas atmosphere at 300° C. for 3 minutes to melt it.

2. Polymerization of Polyarylene Sulfide of Example 2

Reactants including 4000 g of para diiodobenzene, 12 g of polymerization terminator, 350 g of sulfur, and 15 g of 1,3-diiodo-4-nitrobenzene were melt mixed at 180° C. A polymerization reaction was progressed while increasing the temperature of the mixture from 180° C. to 340° C., and reducing the pressure from atmospheric pressure to 10 torr. 5 hours after the polymerization was initiated, 10 g of sulfur was additionally introduced, and polymerization was progressed for additional 4 hours to obtain polymer.

The produced polymer had MV 1100 poise, Tm 278° C., and melt viscosity change rate of +4%/10 min, as measured under shear rate of 1 rad/s in a plate-plate rheometer, after heat treating the polyarylene sulfide under inert gas atmosphere at 300° C. for 3 minutes to melt it.

3. Polymerization of Polyarylene Sulfide of Example 3

Reactants including 4000 g of para diiodobenzene, 15 g of polymerization terminator, 355 g of sulfur, and 15 g of 1,3-diiodo-4-nitrobenzene were melt mixed at 180° C. A polymerization reaction was progressed while increasing the temperature of the mixture from 180° C. to 340° C., and reducing the pressure from atmospheric pressure to 10 torr. 5 hours after the polymerization was initiated, 15 g of sulfur was additionally introduced, and polymerization was progressed for additional 5 hours to obtain polymer.

The produced polymer had MV 2000 poise, Tm 278° C., and melt viscosity change rate of +7%/10 min, as measured under shear rate of 1 rad/s in a plate-plate rheometer, after heat treating the polyarylene sulfide under inert gas atmosphere at 300° C. for 3 minutes to melt it.

4. Polymerization of Polyarylene Sulfide of Example 4

Reactants including 4000 g of para diiodobenzene, 17 g of polymerization terminator, 358 g of sulfur, and 15 g of 1,3-diiodo-4-nitrobenzene were melt mixed at 180° C. A polymerization reaction was progressed while increasing the temperature of the mixture from 180° C. to 340° C., and reducing the pressure from atmospheric pressure to 10 torr. 5 hours after the polymerization was initiated, 18 g of sulfur was additionally introduced, and polymerization was progressed for additional 8 hours to obtain polymer.

The produced polymer had MV 2000 poise, Tm 275° C., and melt viscosity change rate of +10%/10 min, as measured under shear rate of 1 rad/s in a plate-plate rheometer, after heat treating the polyarylene sulfide under inert gas atmosphere at 300° C. for 3 minutes to melt it.

5. Polymerization of Polyarylene Sulfide of Example 5

Reactants including 4000 g of para diiodobenzene, 12 g of polymerization terminator, 355 g of sulfur, and 15 g of 1,3-diiodo-4-nitrobenzene were melt mixed at 180° C. A polymerization reaction was progressed while increasing the temperature of the mixture from 180° C. to 340° C., and reducing the pressure from atmospheric pressure to 10 torr. 5 hours after the polymerization was initiated, 10 g of sulfur was additionally introduced, and polymerization was progressed for additional 5 hours to obtain polymer.

The produced polymer had MV 1200 poise, Tm 279° C., and melt viscosity change rate of +2%/10 min, as measured under shear rate of 1 rad/s in a plate-plate rheometer, after heat treating the polyarylene sulfide under inert gas atmosphere at 300° C. for 3 minutes to melt it.

The reactants and the added amounts of the polymerization reactions of Comparative Examples and Examples are shown in the following Table 1, and the property values of the resins polymerized by different methods of Examples and Comparative Examples are measured according to the following Experimental Example and shown in the following Table 2.

Preparation of Melt Processed Products of Polyarylene Sulfide of Examples and Comparative Examples 40 wt % of glass fiber, 0.3 wt % of lubricant, 0.2 wt % of oxidation stabilizer, and remaining content of the polyarylene sulfide resin polymerized according to Comparative Examples 1 to 3 and Examples 1 to 5 were introduced into a twin screw extruder, and compounded (HAAKE Company, PolyLab System, 340° C.), and then, dried at 150° C. for 2 hours, and, injection mold temperature was fixed at 140° C., and then, tensile specimen was injected with an injector (Boy Company, 12M, 320°), and tensile strength of the compounded specimen was measured.

And, 40 wt % of glass fiber, 0.3 wt % of lubricant, 0.2 wt % of oxidation stabilizer, and remaining content of the polyarylene sulfide resin polymerized according to Comparative Examples 1 to 3 and Examples 1 to 5 after passing a twin screw extruder 4 times, (HAAKE Company, PolyLab System, 315° C.) were mixed to prepare compounded resin.

The tensile strengths of the resin immediately after polymerization and the resin after passing an extruder 4 times of Examples and Comparative Examples were measured and shown in the following Table 3.

Experimental Example

Measurement of Polyarylene Sulfide of Comparative Examples and Examples

1. Analysis of Melt Viscosity

For the property analysis of the polymers synthesized according to Comparative Examples and Examples, melt viscosity was measured at 300° C. with a rotating disk viscometer. To measure by Frequency sweep method, angular frequency was measured from 0.6 to 500 rad/s, and the viscosity at 1.0 rad/s was defined as melt viscosity.

2. Measurement of Melting Point (Tm)

Melting point was measured using Differential Scanning calorimeter (DSC) while increasing temperature from 30° C. to 320° C. at a speed of 10° C./min, cooling to 30° C., and then, increasing temperature again from 30° C. to 320° C. at a speed of 10° C./min.

3. Measurement of Melt Viscosity Change Rate

The polymer samples polymerized according to Examples and Comparative Examples were molten at 300° C. for 3 minutes under nitrogen atmosphere, and then, melt viscosity was measured at 1 second intervals under shear rate of 1 rad/s in a plate-plate rheometer. The melt viscosity change rate was measured based on the melt viscosity measured after 10 minutes. The change rate is expressed as the following Equation 1.

Melt viscosity change rate(%)=100($MV_f/MV_i$−1)    [Equation 1]

In the Equation 1, $MV_i$ denotes the initial melt viscosity of polyarylene sulfide, and $MV_f$ is the melt viscosity of polyarylene sulfide after heat treating the polyarylene sulfide at 300° C. to melt it.

4. Tensile Strength

Tensile strength was measured when a type I specimen was pulled at a speed of 5 mm/min using UTM (Universal testing machine, Dong-il Shimadzu Corp., AG-X 10kN) according to the method described in ASTM D638.

5. Measurement of Elongation

Elongation was measured when a type I specimen was pulled at a speed of 5 mm/min using UTM (Universal testing machine, Dong-il Shimadzu Corp., AG-X 10kN) according to the method described in ASTM D638. The used gauge length was 50 mm, and the elongation means the stretched length of material at tensile test.

6. Analysis of Iodine Content in Polyarylene Sulfide

After grinding samples, a specific amount thereof was combusted and ionized with absorbent such as pure water, and the like, and then, the concentration of iodine ions was measured using combustion ion chromatograph. As the combustion equipment, AQF-100 (Mitshubishi Company) was used, and as the IC equipment, ICS-2500 (DIONEX Company) was used.

TABLE 1

| Preparation of polyarylene sulfide of Comparative Examples | |
|---|---|
| Comparative Example 1 | 0205P4 grade (Ticona Company) |
| Comparative Example 2 | hb grade (Deyang Company) |
| Comparative Example 3 | Ryton P6 grade (Chevron Philips Company) |

| | Reactants of Examples | | | | | | |
|---|---|---|---|---|---|---|---|
| | pDIB(g) | Polymerization terminator**(g) | Sulfur (g) | catalyst* (g) | Additionally introduced sulfur (g) | Introduction time of sulfur***(hr) | Total polymerization reaction time (hr) |
| Example 1 | 4000 | 10 | 345 | 15 | 5 | 5 | 8 |
| Example 2 | 4000 | 12 | 350 | 15 | 10 | 5 | 9 |
| Example 3 | 4000 | 15 | 355 | 15 | 15 | 5 | 10 |
| Example 4 | 4000 | 17 | 358 | 15 | 18 | 5 | 13 |
| Example 5 | 4000 | 12 | 355 | 15 | 10 | 5 | 10 |

(comment)* As the catalyst, 1, 3-diiodo-4-introbenzene is used.
**As the polymerization terminator, diphenyl disulfide is used.
***The introduction time of additional S refers to the time elapsed after the polymerization reaction is initiated.

TABLE 2

| | Properties of polyarylene sulfide | | | |
|---|---|---|---|---|
| | Tm (° C.) | $MV_i$ (Poise) | $MV_f$ (Poise) | M.V. change rate(%) |
| Comparative Example 1 | 282 | 700 | 616 | −12 |
| Comparative Example 2 | 280 | 2000 | 1820 | −9 |
| Comparative Example 3 | 281 | 1100 | 847 | −23 |
| Example 1 | 280 | 700 | 721 | 3 |
| Example 2 | 278 | 1100 | 1144 | 4 |
| Example 3 | 278 | 2000 | 2140 | 7 |
| Example 4 | 275 | 2000 | 2200 | 10 |
| Example 5 | 279 | 1200 | 1224 | 2 |

TABLE 3

| | Immediately after polymerization | | | After passing extruder 4 times | | |
|---|---|---|---|---|---|---|
| | Compounding tensile strength (kgf/cm$^2$) | elongation (%) | Iodine content (wt %) | Compounding tensile strength (kgf/cm$^2$) | Elongation (%) | Iodine content (wt %) |
| Comparative Example 1 | 1700 | 1.9 | 0 | 1650 | 1.8 | 0 |
| Comparative Example 2 | 1400 | 1.8 | 0 | 1310 | 1.6 | 0 |
| Comparative Example 3 | 1500 | 1.3 | 0 | 1360 | 1.2 | 0 |
| Example 1 | 1520 | 1.7 | 0.6 | 1590 | 1.7 | 0.6 |
| Example 2 | 1570 | 1.6 | 0.4 | 1620 | 1.7 | 0.4 |
| Example 3 | 1630 | 1.8 | 0.3 | 1670 | 1.9 | 0.3 |
| Example 4 | 1580 | 1.5 | 0.2 | 1640 | 1.6 | 0.2 |
| Example 5 | 1600 | 1.7 | 0.4 | 1670 | 1.8 | 0.4 |

As shown in the Table 2, the products of Comparative Example have minus melt viscosity change rate, while the products of Examples 1 to 5 have plus melt viscosity change rate. Thus, as shown in the Table 3, the products of Comparative Examples 1 to 3 have decreased tensile strength after passing the extruder 4 times, while the products of Examples 1 to 5 have increased tensile strength after passing the extruder 4 times, compared to immediately after polymerization. There is not substantial difference between iodine contents immediately after polymerization and after passing the extruder 4 times, but the iodine content may be decreased a little within measurement method error.

Meanwhile, from these results, it is expected that the polyarylene sulfide of Examples may exhibit and maintain excellent mechanical properties, particularly exhibit little deterioration of mechanical properties, and thus, it may be usefully applied in the industrial field of preparing and recycling polyarylene sulfide.

What is claimed is:

1. A method for preparing polyarylene sulfide, comprising:
polymerizing reactants comprising diiodide aromatic compounds, an initial amount of sulfur compound, and, based on 100 parts by weight of the diiodide aromatic compounds, 0.05 to 10 parts by weight of a polymerization terminator; and
adding an additional amount of sulfur compound at a point after the addition of the initial amount of a sulfur compound, wherein the additional amount of sulfur compound is 1 to 10 parts by weight based on 100 parts by weight of the initial amount of sulfur compound;
wherein the polyarylene sulfide has an initial melt viscosity of 300 to 6000 poise measured at 300° C., and a melt viscosity after heat treated and molten at 300° C. which is equal to or greater than the initial melt viscosity; and
wherein the polyarylene sulfide has a melt viscosity change rate of 0 to 20% as defined by Equation 1:

Melt viscosity change rate(%)=100($MV_f/MV_i$−1)   [Equation 1]

wherein:
$MV_i$ denotes the initial melt viscosity of polyarylene sulfide, and $MV_f$ is the melt viscosity of polyarylene sulfide after heat treating the polyarylene sulfide at 300° C. and melting it;
the polyarylene sulfide has a melting temperature of 270 to 285° C.; and
the diiodide aromatic compounds are included in that reactants in the content of 0.9 moles or more based on the initial amount of sulfur compounds.

2. The method according to claim 1, wherein the polymerization terminator is at least one selected from the group consisting of diphenyl sulfide, diphenyl ether, diphenyl, benzophenone, monoiodoaryl compounds, benzothiazole, benzothiazolesulfenamide, thiuram, dithiocarbamate and diphenyl disulfide.

3. The method according to claim 1, wherein the diiodide aromatic compound is at least one selected from the group consisting of diiodobenzene, diiodonaphthalene, diiodobiphenyl, diiodobisphenol, and diiodobenzophenone.

4. The method according to claim 1, wherein the polymerization reaction is conducted for 1 to 30 hours while increasing temperature and decreasing pressure under the initial reaction conditions of temperature of 180 to 250° C. and pressure of 50 to 450 torr to the final temperature of 270 to 350° C. and the final pressure of 0.001 to 20 torr.

5. The method according to claim 1, further comprising melt mixing the reactants including the diiodide aromatic compounds, the sulfur compounds, and the polymerization terminator, before the polymerization reaction.

6. The method according to claim 1, wherein the polymerization reaction is progressed in the presence of a nitrobenzene-based catalyst.

* * * * *